US008169388B2

(12) United States Patent
Galbraith, Jr. et al.

(10) Patent No.: US 8,169,388 B2
(45) Date of Patent: May 1, 2012

(54) COLOR CORRECTION APPARATUS

(75) Inventors: Walter J. Galbraith, Jr., Sunnyvale, CA (US); Wei Chen, Palo Alto, CA (US); John Zhong, Cupertino, CA (US); Victor Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 766 days.

(21) Appl. No.: 11/772,801

(22) Filed: Jul. 2, 2007

(65) Prior Publication Data
US 2009/0009442 A1 Jan. 8, 2009

(51) Int. Cl.
G09G 5/00 (2006.01)
(52) U.S. Cl. .......................................................... 345/83
(58) Field of Classification Search .................. 345/102, 345/88, 87, 84, 83, 55, 30; 362/97.1, 97.2
See application file for complete search history.

(56) References Cited

U.S. PATENT DOCUMENTS

| 5,280,372 | A | 1/1994 | Horiuchi |
| 5,550,715 | A | 8/1996 | Hawkins |
| 6,559,827 | B1 * | 5/2003 | Mangerson ................... 345/102 |
| 6,871,982 | B2 | 3/2005 | Holman et al. |
| 7,072,096 | B2 | 7/2006 | Holman et al. |
| 2004/0037079 | A1 | 2/2004 | Luk |
| 2004/0109095 | A1 | 6/2004 | Chou |
| 2004/0245910 | A1 * | 12/2004 | Tang et al. ................... 313/483 |
| 2004/0246696 | A1 | 12/2004 | Yoo |
| 2005/0031291 | A1 | 2/2005 | Gao et al. |
| 2005/0128376 | A1 | 6/2005 | Li et al. |
| 2005/0207156 | A1 | 9/2005 | Wang et al. |
| 2005/0224946 | A1 | 10/2005 | Dutta |
| 2005/0243576 | A1 | 11/2005 | Park et al. |
| 2006/0057753 | A1 * | 3/2006 | Schardt et al. ................. 438/34 |
| 2006/0221619 | A1 | 10/2006 | Nishigaki |
| 2007/0139919 | A1 * | 6/2007 | Yue ................................ 362/225 |
| 2007/0291196 | A1 * | 12/2007 | Wang et al. ..................... 349/62 |
| 2008/0074901 | A1 * | 3/2008 | David et al. ................... 362/612 |
| 2008/0137364 | A1 * | 6/2008 | Liu ............................... 362/606 |
| 2008/0224973 | A1 * | 9/2008 | Louwsma ........................ 345/88 |

FOREIGN PATENT DOCUMENTS

| EP | 0 781 660 | 7/1997 |
| JP | 05 021848 | 1/1993 |
| JP | 06 314071 | 11/1994 |
| WO | WO-2004/076913 | 9/2004 |
| WO | WO-2006/027883 | 3/2006 |

OTHER PUBLICATIONS

IBM Technical Disclosure Bulletin, "Flex Interconnect of Multi-Chip Modules" (1993) 36(12):463-464.

* cited by examiner

Primary Examiner — Richard Hjerpe
Assistant Examiner — Jeffrey A Parker
(74) Attorney, Agent, or Firm — Morrison & Foerster LLP

(57) ABSTRACT

A display system provides a display assembly having a display screen. LEDs are presorted into a plurality of groups, each group of LEDs having substantially the same color that is different than the color of another group. LEDs are selected from one of the groups. The selected LEDs are mounted in the display assembly to illuminate the display screen. A non-electronic color adjuster is mounted in the light path from the selected LEDs to shift the light color to a predetermined color.

24 Claims, 7 Drawing Sheets

COLOR CORRECTION APPARATUS

TECHNICAL FIELD

The present invention relates generally to device display systems, and more particularly to a system for illuminating display systems.

BACKGROUND ART

As computer technology has advanced, the demand for portable computer systems, such as laptops, has increased. Portable computers have dramatically increased the mobility of computing power for the computer user. Since the first portable computer, manufacturers have increased computer mobility by decreasing the size, weight, and power demands of portable computers while increasing the battery life for portable computers.

The monitors presently used contribute greatly to the overall size and weight of the portable computer. The monitor must be of a sufficient size, brightness, and clarity to provide the user with readable images. In order to achieve these requirements, monitors place a great burden on available power resources and are therefore a significant contributor indirectly as well as directly to the weight of the portable computer.

Typically, portable computer monitors utilize a liquid crystal display system. The liquid crystal display systems typically include a top plastic or glass panel and a bottom plastic or glass panel, having a liquid crystal display of thin film transistors and liquid crystal material therebetween. These systems also utilize a backlight system that typically includes a diffuser for passing light evenly to the liquid crystal display, a cold cathode fluorescent lamp ("CCFL") for producing light, a reflector for directing the light toward the diffuser, and a light pipe located between the diffuser and the reflector to spread light to the entire surface of the diffuser.

The use of conventional CCFL liquid crystal display systems in the monitors of portable computers, however, creates a limiting factor in the continuing effort to reduce the size and weight of portable computers. CCFL technology has not kept pace with advances in other technologies that have reduced the size and weight of many of the other display components. Today, one of the major limitations in further reducing the thickness and weight of the display is therefore the CCFL illumination system.

Light-emitting diode ("LED") technology offers attractive alternatives to the CCFL. LEDs are much thinner than the CCFL and do not require many of the weighty power supply systems of the CCFL. However, one LED is not sufficient to light an entire display.

A challenge with utilizing LEDs in large arrays is maintaining uniformity of color in large numbers of LEDs. The color balance and spectra of the LEDs is limited by numerous factors such as manufacturing variances and the LED phosphorescence. For example, white LEDs are often actually blue LEDs with a complimentary phosphor dot on the front of the LED. Depending upon manufacturing precision (and thus, related manufacturing costs), actual colors may therefore vary from, for example, slightly blue to slightly pink. Understandably, reducing or compensating for such variability increases cost and complexity significantly as the number of LEDs increases in such larger display configurations and environments. Thus, if LEDs are to become a viable alternative to CCFLs, an economical and practical solution must be found for a way to utilize a large number of LEDs while maintaining uniformity of color.

In view of ever-increasing commercial competitive pressures, increasing consumer expectations, and diminishing opportunities for meaningful product differentiation in the marketplace, it is increasingly critical that answers be found to these problems. Moreover, the ever-increasing need to save costs, improve efficiencies, improve performance, and meet such competitive pressures adds even greater urgency to the critical necessity that answers be found to these problems.

Solutions to these problems have been long sought but prior developments have not taught or suggested any solutions and, thus, solutions to these problems have long eluded those skilled in the art.

SUMMARY OF THE INVENTION

The present invention provides a display assembly having a display screen. LEDs are presorted into a plurality of groups, each group of LEDs having substantially the same color that is different than the color of another group. LEDs are selected from one of the groups. The selected LEDs are mounted in the display assembly to illuminate the display screen. A non-electronic color adjuster is mounted in the light path from the selected LEDs to shift the light color to a predetermined color.

Certain embodiments of the invention have other aspects in addition to or in place of those mentioned above. The aspects will become apparent to those skilled in the art from a reading of the following detailed description when taken with reference to the accompanying drawings.

DETAILED DESCRIPTION

Figure 1:
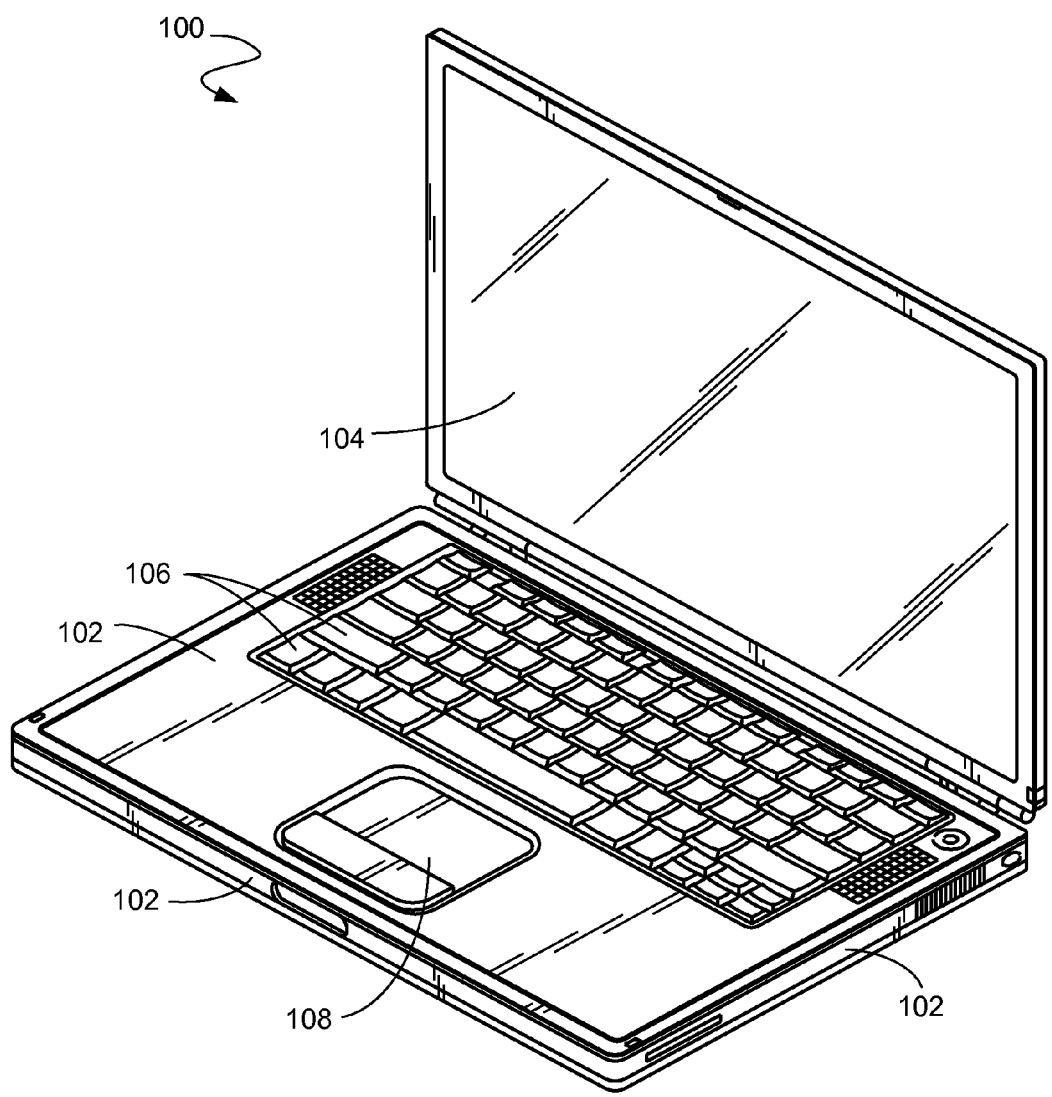
FIG. 1 is a view of a portable computer incorporating a screen illuminated by LEDs on a removable light strip according to the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Similarly, the drawings showing embodiments of the system are semi-diagrammatic and not to scale and, particularly, some of the dimensions are for the clarity of presentation and are exaggerated in the drawing FIGs. Likewise, although the views in the drawings for ease of description generally show similar orientations, this depiction in the FIGs. is arbitrary for the most part. Generally, the invention can be considered, understood, and operated in any orientation.

In addition, where multiple embodiments are disclosed and described having some features in common, for clarity and ease of illustration, description, and comprehension thereof, similar and like features one to another will ordinarily be described with like reference numerals.

For expository purposes, terms, such as "above", "below", "bottom", "top", "side" (as in "sidewall"), "higher", "lower", "upper", "over", and "under", are defined with respect to the back of the display device except where the context indicates a different sense. The term "on" means that there is direct contact among elements.

The term "system" as used herein refers to and is defined as the method and as the apparatus of the present invention in accordance with the context in which the term is used.

Referring now to FIG. 1, therein is shown a portable computer 100 having a base 102 attached to a screen 104. In this embodiment, the base 102 contains most of the components of the portable computer 100 such as a keyboard 106, a trackpad 108, a disk drive (not shown), and the motherboard (not shown).

Figure 2:
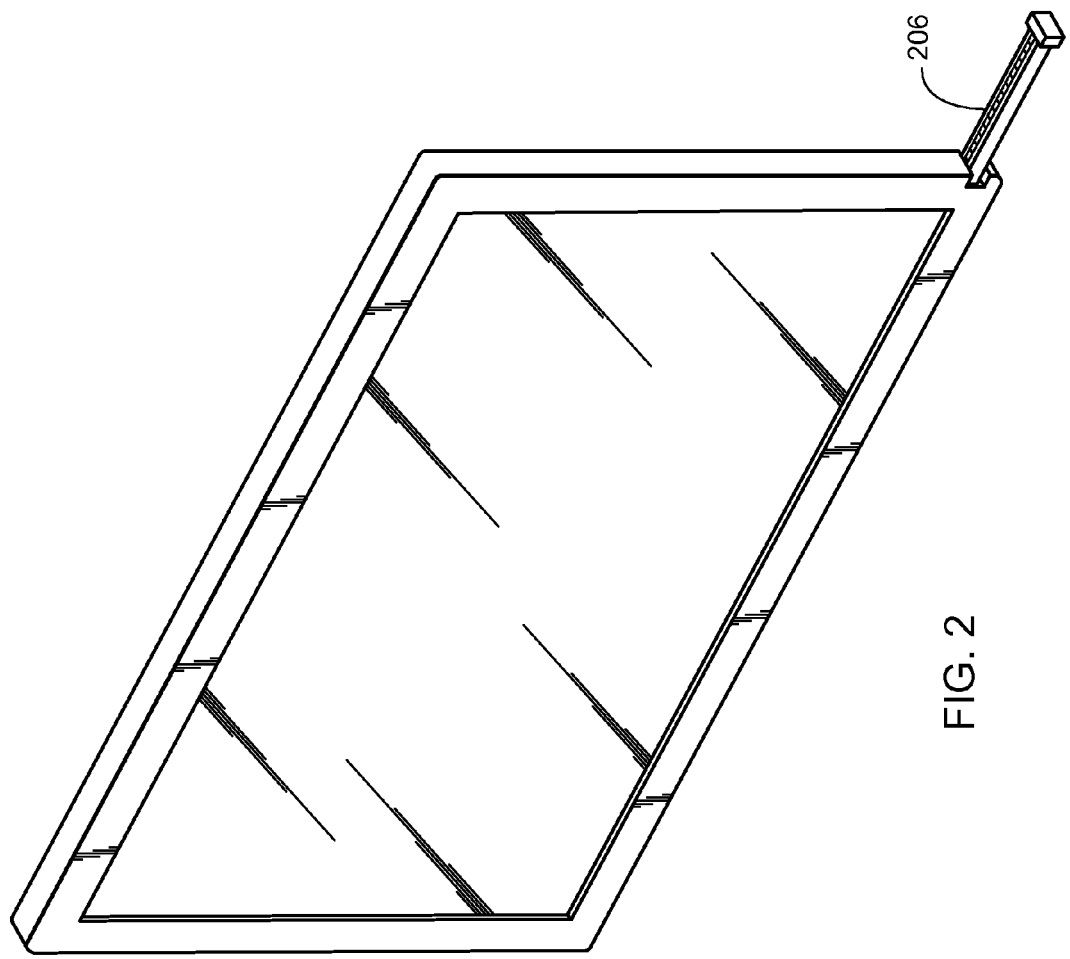
FIG. 2 is an enlarged detail from FIG. 1 of the screen with the removable light strip.

Referring now to FIG. 2, therein is shown a close up of the screen 104. In this embodiment the screen 104 is a liquid crystal display ("LCD"). The screen 104 is electrically connected by suitable connectors (not shown, but see the power feed contact 318, FIG. 3) to a removable light strip 206. The removable light strip 206, which is shown partially inserted into the screen 104, illuminates the screen 104 from the base or bottom thereof. When fully inserted into the screen 104, the removable light strip 206 is retained therein by a suitable retaining means, such as a detent, latch, and so forth (not shown).

Figure 3:
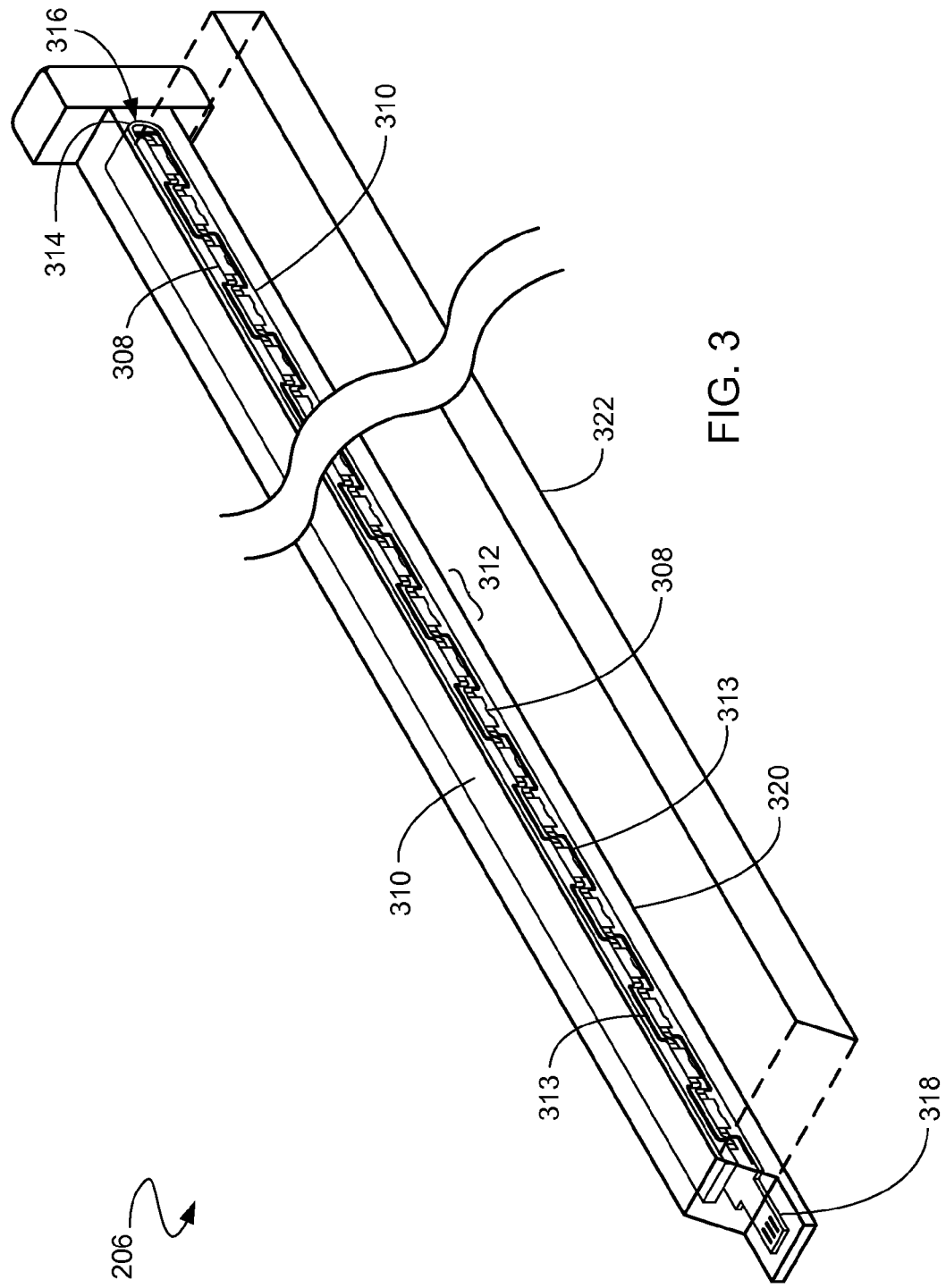
FIG. 3 is an enlarged detail from FIG. 2 of the removable light strip.

Referring now to FIG. 3, therein is shown a close up of the removable light strip 206. In this embodiment, side firing light-emitting diodes ("LEDs") 308 are mounted on and electrically connected to one another on a flex 310. The flex 310 is a conventional flexible medium onto which electrical components and connections are mounted. The LEDs 308 are spaced a distance 312 from each other. The distance 312 is equal to or greater then the length of the LEDs 308 and forms alignment areas 313. In this embodiment, the flex 310 has a fold 314 where the flex 310 is folded back on itself to form a folded flex 316. The folded flex 316 has a power feed contact 318 that connects (not shown) to the screen 104 (FIG. 2) when inserted thereinto. The folded flex 316 is encased in an assembly housing 320. The assembly housing 320 provides support for the folded flex 316, the LEDs 308, and the power feed contact 318. In one embodiment, an optical film 322 is mounted between the LEDs 308 and the screen 104.

LEDs, such as the LEDs 308, are point light sources. Therefore when illuminating a screen with LEDs, it is generally preferable to use many LEDs to efficiently and economically obtain uniform illumination of the screen. Desired brightness levels are much more readily and economically obtained as well through the use of multiple LEDs, since LED costs increase dramatically with higher individual output light levels.

In order to achieve uniform and economical lighting across the screen 104, the multiple LEDs 308 must preferably have a uniform color. The color balance and spectra of the LEDs 308 is limited by the phosphorescence. For example, white LEDs are often actually blue LEDs with a complimentary phosphor dot on the front of the LED. Depending upon manufacturing precision (and thus, related manufacturing costs), actual colors may vary from, for example, slightly blue to slightly pink. Understandably, reducing or compensating for such variability increases cost and complexity significantly as the number of LEDs increases in larger display configurations and environments. Prior solutions have therefore attempted to improve manufacturing processes and controls to produce highly uniform LEDs. Unfortunately, this has resulted in high production costs and significant waste when non-compliant LEDs could not be used and were rejected (thereby further increasing costs).

Figure 4:
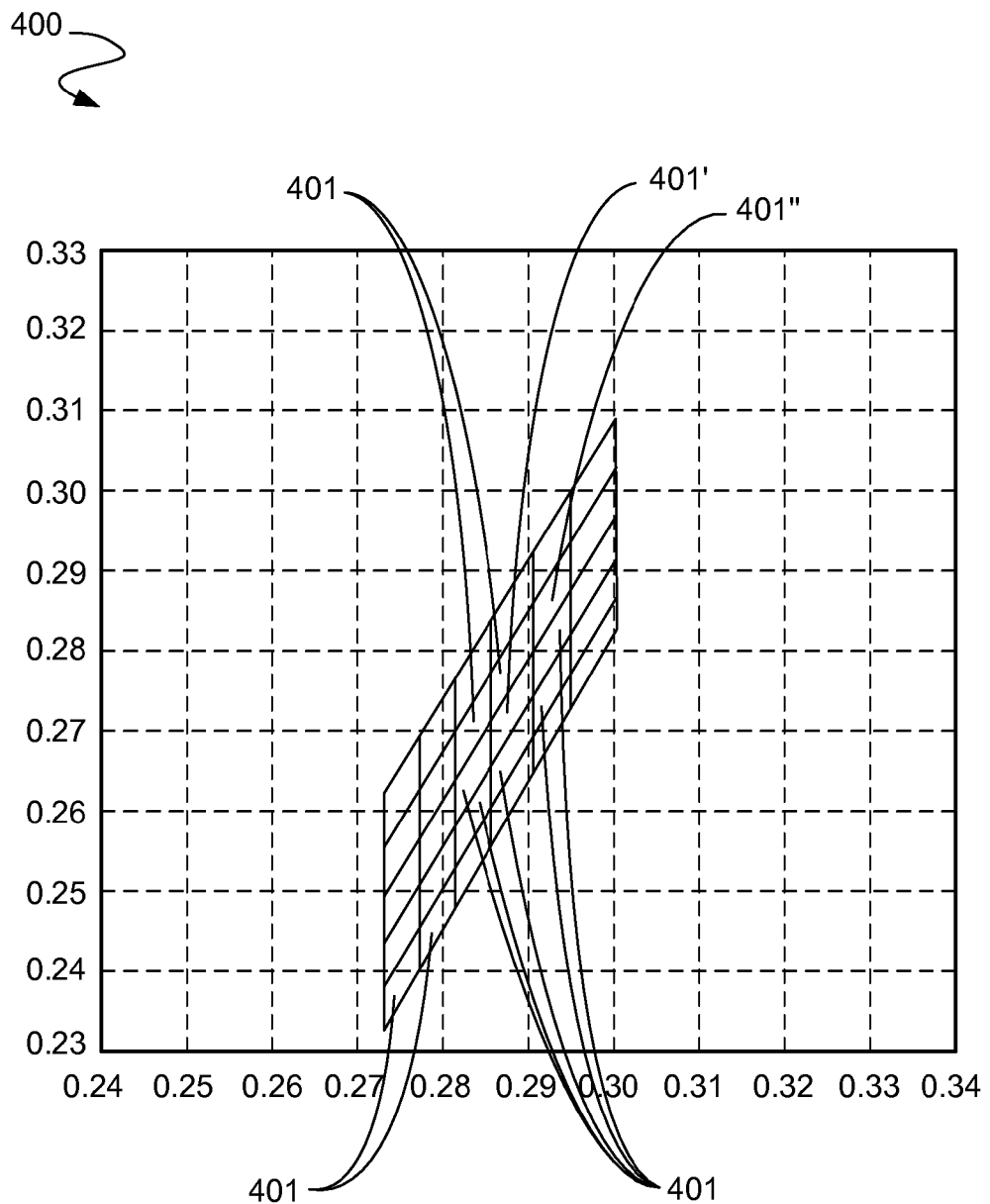
FIG. 4 is a representative LED color binning chart.

Referring now to FIG. 4, therein is shown a representative LED color binning chart 400. Using this or a similar chart, production LEDs are sorted into groups of substantially matching colors. That is, all LEDs having colors that fall within a same small region or "bin" 401 of the color binning chart 400 are sorted together with others having the same color output. As previously suggested, only a few of the bins 401, located around a particular desired white point color, have LEDs contained therein that are considered acceptable for production displays. LEDs sorted into other bins have been regarded as unacceptable or unusable.

As is well known in the art in the science of lighting, there is a continuum of colors of light that can be called "white". One set of colors that deserve this description are the colors emitted, via the process called incandescence, by a black body at various relatively-high temperatures. For example, the color of a black body at a temperature of 2848 kelvins matches that produced by domestic incandescent light bulbs. It is said that the color temperature of such a light bulb is 2848 K. The white light used in theatre illumination has a color temperature of about 3200 K. Daylight has a nominal color temperature of 5400 K (called equal energy white), but can vary from a cool red up to a bluish 25,000 K. Not all black body radiation can be considered white light: the background radiation of the universe, to name an extreme example, is only a few kelvins and is quite invisible.

Standard whites are often defined with reference to the International Commission on Illumination's (CIE's) chromaticity diagram. These are the D series of standard illuminants. Illuminant D65, originally corresponding to a color temperature of 6,500 K, is taken to represent standard daylight.

Computer displays often have a color temperature control, allowing the user to select the color temperature (usually from a small set of fixed values) of the light emitted when the computer produces the electrical signal corresponding to "white". The RGB coordinates of white are 255 255 255, regardless of the color temperature that is actually selected for white.

It has been unexpectedly discovered, according to the present invention, that color balance and uniformity across different production displays can be maintained while using LEDs with wide variations in white point colors, thereby utilizing substantially all of the bins 401.

More particularly, according to the present invention, to achieve color balance and uniformity, LEDs with various white points are first sorted and binned into the bins 401, as before. This results in the LEDs in each of the bins 401 forming presorted groups, such as a first presorted bin 401', a second presorted bin 401", and so forth, in which the LEDs within each bin produce substantially the same white point as others within the same group or bin 401. Different bins (e.g., bin 401' and bin 401"), in turn, each have their own, different white points.

According to the present invention, only the LEDs 308 (FIG. 3) with substantially the same white point (i.e., from the bin 401') are then used exclusively together within a particular individual display 104 (FIG. 2). In another display, LEDs from that same bin may be used again, as long as a sufficient supply of LEDs is available from that single bin. But eventually, that bin (e.g., bin 401') will be exhausted. Then LEDs from another single bin (e.g., bin 401") will be used exclusively in fabricating another particular individual display. And so forth.

It will be appreciated that the production displays produced in this manner, with nothing more, would not exhibit color uniformity from all displays, one to another. Therefore, according to the present invention, when the LEDs that are selected from a particular bin do not have the particular predetermined white point that is desired, the optical film 322 (FIG. 3) is provided with a slight color tint to shift the LEDs' color to the desired predetermined white point color. The optical film 322 is thus a non electronic color adjuster that, while perhaps slightly reducing the brightness due to its tint, nevertheless produces the desired white point. If desired, the LED brightness can then easily be increased to compensate for attenuation from the optical film 322.

As illustrated in FIG. 3, optical film 322 is coupled to the LEDs 308 on removable light strip 208. Thus, removable light strip 208—including LEDs 308 and optical film 322—can be inserted and removed from display 104. Accordingly, if a removable light strip fails, it can be removed and replaced by another light strip, which may or may not contain LEDs from the same color bin. In this way, display 104 can be used in combination with LEDs of any color bin, provided the correct optical film is added to the associated removable light strip. Further, as a result of the coupling of optical film 322 to LEDs 308, any optical system within the display 104 configured to distribute or otherwise control the light emitted from the LEDs 308 is separated from the LEDs 308 by the optical film 322.

A principle advantage of combining binning with the optical film 322 according to the present invention is that the full color range available to the display 104 is then preserved. The full color range is preserved because the LCD screen 104 (FIG. 1) is not compromised by the need for it to generate a color shift for the LED light source.

As taught by the present invention, therefore, by using LEDs 308 with a consistent white point in conjunction with the optical film 322, color balance and uniformity can be maintained between multiple large displays while avoiding the increased manufacturing costs that would result from requiring highly consistent LEDs, all with substantially the same white point.

Figure 5:
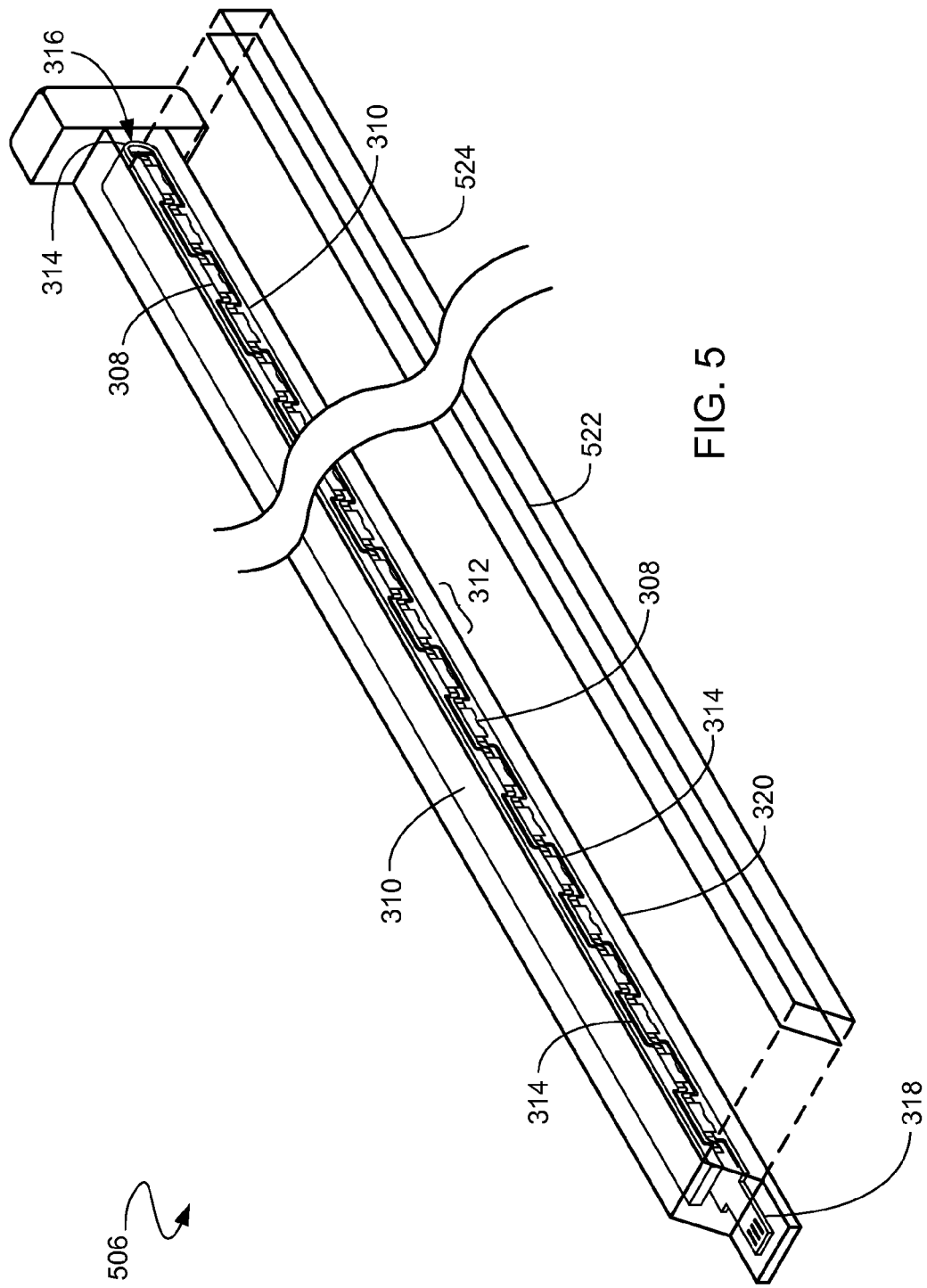
FIG. 5 is a view of a removable light strip according to an alternate embodiment of the present invention.

Referring now to FIG. 5, therein is shown a close up of a removable light strip 506, according to an alternate embodiment of the present invention. A second optical film 524 is mounted between a first optical film 522 and the screen 104 (FIG. 2). The first optical film 522 and the second optical film 524 allow for a greater color adjustment than just the first optical film 522 alone. Thus, a broader range of color adjustments can be made with fewer optical films by stacking optical films 522 and 524 of the same color or of different colors. This in turn saves money by reducing the number of different optical films needed for inventory.

In like manner, additional optical films may be stacked onto the first and second optical films 522 and 524 according to the configuration and desired results at hand.

Figure 6:
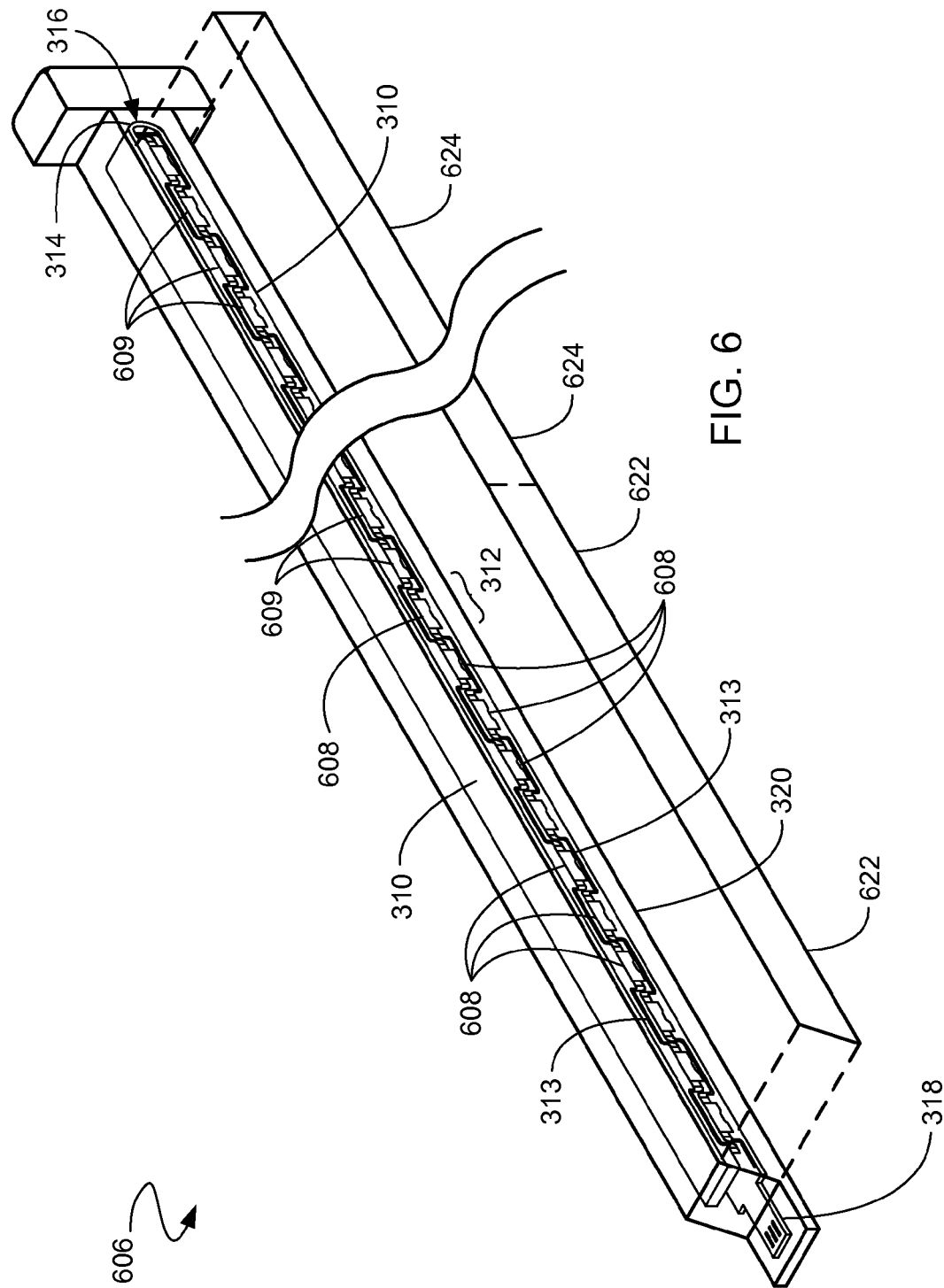
FIG. 6 is a view of a removable light strip according to another alternate embodiment of the present invention.

Referring now to FIG. 6, therein is shown a close up of a removable light strip 606, according to another alternate embodiment of the present invention. First LEDs 608 are mounted together in a first group on the removable light strip 606, and second LEDs 609 are mounted together in a second group, separate from the first LEDs 608, on the removable light strip 606. The first LEDs 608 and the second LEDs 609 are from different bins 401 and produce different colored light. A second optical film 624 is accordingly mounted next to a first optical film 622, respectively in the light paths from the first LEDs 608 and the second LEDs 609. The first optical film 622 and the second optical film 624 are of different compensating colors matched respectively to the first LEDs 608 and the second LEDs 609, according to their different respective bins 401 (FIG. 4). Thus, different bins 401 with various LEDs may be used within the same removable light strip 606, and the removable light strip 606 will produce substantially the same predetermined colored light across the screen 104 (FIG. 2). Based upon this disclosure, it will now therefore be clear to one of ordinary skill in the art that multiple groups of LEDs can thus be used, and if desired, that each group of LEDs can be separately powered to compensate for variations in net light intensity.

It has thus been unexpectedly discovered that, by binning and using the LEDs in groups, as taught herein, virtually the full range of the production LEDs can be readily and advantageously utilized in production displays.

Figure 7:
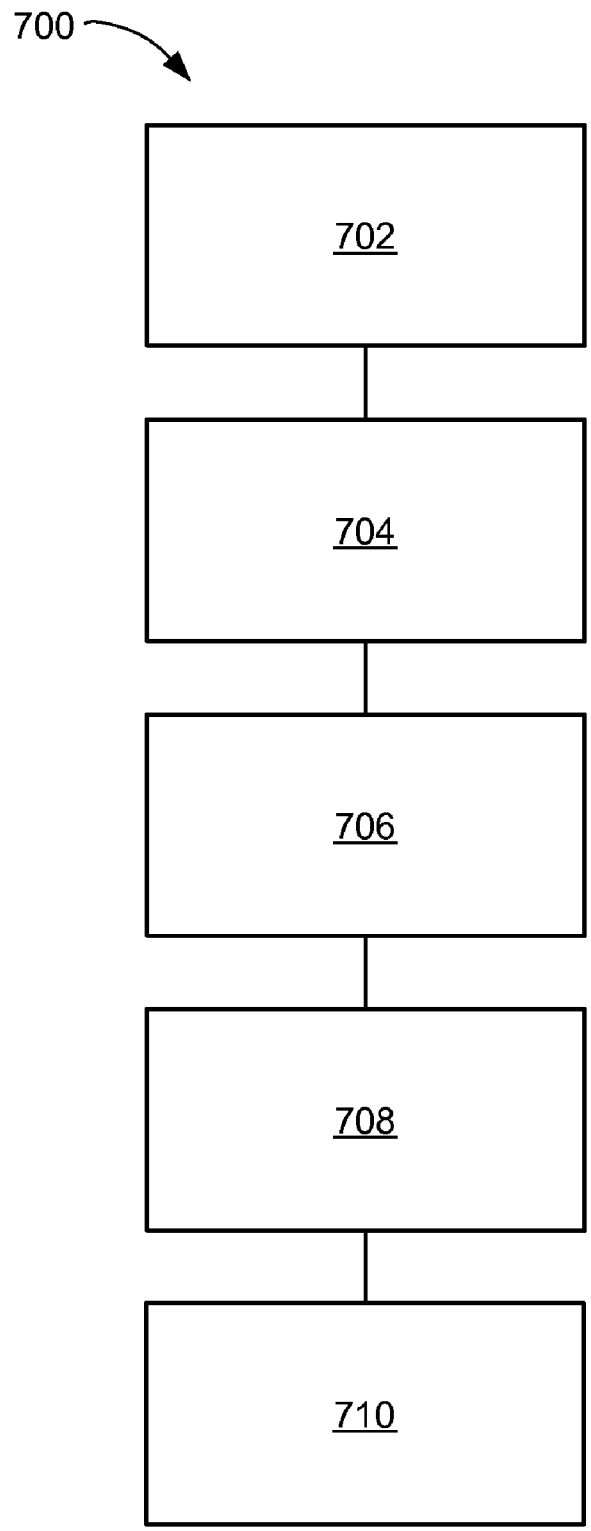
FIG. 7 is a flow chart of a display system in accordance with an embodiment of the present invention.

Referring now to FIG. 7, therein is a flow chart of a system 700 for a display system in accordance with an embodiment of the present invention. The display system 700 includes providing a display assembly having a display screen in a block 702; presorting LEDs into a plurality of groups, each group of LEDs having substantially the same color that is different than the color of another group in a block 704; selecting LEDs from one of the groups in a block 706; mounting the selected LEDs in the display assembly to illuminate the display screen in a block 708; and mounting a non-electronic color adjuster in the light path from the selected LEDs to shift the light color to a predetermined color in a block 710.

It has been discovered that the present invention thus has numerous aspects.

A principle aspect that has been unexpectedly discovered is that the present invention readily and advantageously enables essentially all of the bins of LEDs to be used.

Another important aspect is that all the LEDs can be used while maintaining uniform color output across the entire display production.

Yet another important aspect of the present invention is that it valuably supports and services the historical trend of reducing costs, simplifying systems, and increasing performance.

These and other valuable aspects of the present invention consequently further the state of the technology to at least the next level.

Thus, it has been discovered that the display system of the present invention furnishes important and heretofore unknown and unavailable solutions, capabilities, and functional aspects for utilizing virtually the full range of production LEDs. The resulting processes and configurations are straightforward, cost-effective, uncomplicated, highly versatile and effective, can be surprisingly and unobviously implemented by adapting known technologies, and are thus readily suited for efficiently and economically manufacturing display devices. The resulting processes and configurations are straightforward, cost-effective, uncomplicated, highly versatile, accurate, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A display system, comprising:
   a display assembly having a display screen;
   a first plurality of LEDs that are:
   selected to each produce substantially the same color; and
   mounted in the display assembly to illuminate the display screen;
   an optical system configured to distribute light to a viewing area of the display screen, wherein the optical system is positioned in a light path from the first plurality of LEDs to the display screen; and
   a first non-electronic color adjuster in the light path from the first plurality of LEDs to the optical system, wherein the first non-electronic color adjustor comprises a first color-tinted film configured to shift the light color of the first plurality of LEDs to a first desired color.

2. The display system of claim 1 wherein the first non-electronic color adjuster adjusts the light color of the first plurality of LEDs to a desired white point color.

3. The display system of claim 1 wherein the first non-electronic color adjuster further comprises a second color-tinted film and wherein the first and second color-tinted films shift the light color of the first plurality of LEDs to the first desired color.

4. The display system of claim 1:
   further comprising a removable light strip; and
   wherein the first plurality of LEDs are mounted on the removable light strip.

5. The display system of claim 1 wherein the first plurality of LEDs are side firing LEDs.

6. The display system of claim 1 further comprising:
   a second plurality of LEDs that produce different colored light than the first plurality of LEDs; and
   a second non-electronic color adjuster in the light path from the second plurality of LEDs, wherein the second non-electronic color adjustor comprises a second color-tinted film configured to shift the light color of the second plurality of LEDs to a second desired color.

7. A display system, comprising:
   a display assembly having an LCD display screen;
   a first plurality of LEDs that are:
   selected from a bin, wherein a bin comprises a plurality of LEDs that each produce substantially the same color and wherein each bin comprises a color that is different from the other bins; and
   mounted in the display assembly to illuminate the LCD display screen;
   an optical system configured to distribute light to a viewing area of the display screen, wherein the optical system is positioned in a light path from the first plurality of LEDs to the LCD display screen; and
   a first non-electronic color adjuster in the light path from the first plurality of LEDs and between the first plurality of LEDs and the optical system, wherein the first non-electronic color adjustor comprises a first color-tinted film configured to shift the light color of the first plurality of LEDs to a first desired color.

8. The display system of claim 7 wherein the first non-electronic color adjuster adjusts the light color of the first plurality of LEDs to a desired white point color.

9. The display system of claim 7 wherein the first non-electronic color adjuster further comprises a second color-tinted film and wherein the first and second color-tinted films shift the light color of the first plurality of LEDs to the first desired color.

10. The display system of claim 7:
    further comprising a removable light strip; and
    wherein the first plurality of LEDs are mounted on the removable light strip.

11. The display system of claim 8 wherein the first plurality of LEDs are side firing LEDs.

12. The display system of claim 7 further comprising:
    a second plurality of LEDs that are selected from a second bin; and
    a second non-electronic color adjuster in the light path from the second plurality of LEDs and between the second plurality of LEDs and the LCD display screen, wherein the second non-electronic color adjustor comprises a second color-tinted film configured to shift the light color of the second plurality of LEDs to a second desired color.

13. A method of correcting the color output of a display system, wherein the display system comprises a display assembly and a display screen, the method comprising:
    mounting a first plurality of LEDs in the display assembly to illuminate the display screen, wherein the first plurality of LEDs comprises LEDs of substantially the same color;
    mounting an optical system configured to distribute light to a viewing area of the display screen, wherein the optical system is positioned in a light path from the first plurality of LEDs to the display screen; and
    mounting a first non-electronic color adjuster in the light path from the first plurality of LEDs to the optical system, wherein the first non-electronic color adjustor comprises a first color-tinted film configured to shift the light color of the first plurality of LEDs to a first desired color.

14. The method of claim 13 wherein the first non-electronic color adjuster shifts the light color of the first plurality of LEDs to a desired white point color.

15. The method of claim 13 wherein the first non-electronic color adjuster further comprises a second color-tinted film and wherein the first and second color-tinted films shift the light color of the first plurality of LEDs to the first desired color.

16. The method of claim 13 wherein mounting the first plurality of LEDs further comprises:
    mounting the first plurality of LEDs on a removable light strip; and
    mounting the removable light strip in the display assembly.

17. The method of claim 13 wherein the LEDs further comprise side firing LEDs.

18. The method of claim 13 further comprising:
    mounting a second plurality of LEDs in the display assembly to illuminate the display screen, wherein the second plurality of LEDs comprises LEDs of substantially the same color and wherein the color of the second plurality of LEDs is different from the color of the first plurality of LEDs; and
    mounting a second non-electronic color adjuster in the light path from the second plurality of LEDs, wherein the second non-electronic color adjustor comprises a second color-tinted film configured to shift the light color of the second plurality of LEDs to a second desired color.

19. A method of manufacturing a display system capable of color output correction, the display system comprising a display assembly and an LCD display screen, the method comprising:
    mounting a first plurality of LEDs in the display assembly to illuminate the LCD display screen, wherein the first plurality of LEDs comprises a plurality of LEDs from one of a plurality of bins, wherein a bin comprises a plurality of LEDs that each produce substantially the same color and wherein each bin comprises a color that is different from the other bins;

mounting an optical system configured to distribute light to a viewing area of the display screen, wherein the optical system is positioned in a light path from the first plurality of LEDs to the LCD display screen; and mounting a first non-electronic color adjuster in the light path from the first plurality of LEDs between the first plurality of LEDs and the optical system, wherein the first non-electronic color adjustor comprises a color-tinted film configured to shift the light color of the first plurality of LEDs to a first desired color.

20. The method of claim 19 wherein the first non-electronic color adjuster shifts the light color of the first plurality of LEDs to a desired white point color.

21. The method of claim 19 wherein the first non-electronic color adjuster further comprises a second color-tinted film and wherein the first and second color-tinted films shift the light color of the first plurality of LEDs to the first desired color.

22. The method of claim 19 wherein mounting the first plurality of LEDs further comprises:

mounting the first plurality of LEDs on a removable light strip; and mounting the removable light strip in the display assembly.

23. The method of claim 19 wherein the LEDs further comprise side firing LEDs.

24. The method of claim 19 further comprising:

mounting a second plurality of LEDs in the display assembly to illuminate the LCD display screen, wherein the second plurality of LEDs comprises LEDs from another of the plurality of bins; and mounting a second non-electronic color adjuster in the light path from the second plurality of LEDs between the second plurality of LEDs and the LCD display screen, wherein the second non-electronic color adjustor comprises a second color-tinted film to shift the light color of the second plurality of LEDs to a second desired color.

* * * * *